United States Patent
Kinpara et al.

(10) Patent No.: US 8,384,261 B2
(45) Date of Patent: Feb. 26, 2013

(54) STEPPING MOTOR INCLUDING A CONNECTION STRUCTURE OF A STATOR YOKE AND A FRONT PLATE

(75) Inventors: Shuhei Kinpara, Nagano (JP); Yuzuru Suzuki, Nagano (JP); Seiya Fujimoto, Nagano (JP)

(73) Assignee: Minebea Co., Ltd., Nagano (JP)

( * ) Notice: Subject to any disclaimer, the term of this patent is extended or adjusted under 35 U.S.C. 154(b) by 247 days.

(21) Appl. No.: 12/957,811

(22) Filed: Dec. 1, 2010

(65) Prior Publication Data
US 2011/0140558 A1    Jun. 16, 2011

(30) Foreign Application Priority Data

Dec. 11, 2009 (JP) ................ 2009-281915
Dec. 24, 2009 (JP) ................ 2009-291615

(51) Int. Cl.
*H02K 5/00* (2006.01)
*H02K 37/00* (2006.01)
(52) U.S. Cl. .............. 310/89; 310/400; 310/49.01
(58) Field of Classification Search .......... 310/89, 310/258, 271, 406, 408, 410, 418, 422, 423, 310/426, 49; *H02K 5/04, 5/26*
See application file for complete search history.

(56) References Cited

U.S. PATENT DOCUMENTS

| | | | | |
|---|---|---|---|---|
| 3,206,148 A | * | 9/1965 | Longsworth | 248/621 |
| 4,087,709 A | * | 5/1978 | Haydon | 310/83 |
| 4,097,012 A | * | 6/1978 | McIntyre | 248/674 |
| 4,625,134 A | * | 11/1986 | Weaver | 310/83 |

FOREIGN PATENT DOCUMENTS

| | | |
|---|---|---|
| JP | 49-46003 | 12/1974 |
| JP | 61-22473 Y2 | 7/1986 |

* cited by examiner

*Primary Examiner* — Tran N. Nguyen
*Assistant Examiner* — Thomas Truong
(74) *Attorney, Agent, or Firm* — Carrier Blackman & Associates, P.C.; William D. Blackman; Joseph P. Carrier

(57) ABSTRACT

A motor includes a stator having boss portions on an end plate thereof, a front plate provided on an upper surface of the stator, and a band connecting the stator and the front plate. Recess portions are formed adjacent to an outer peripheral edge of the front plate, and a protruding portion is provided in each recess portion. The band has a bottom plate part and attachment parts. The bottom plate part includes notched portions. Each attachment part includes an engagement portion at a tip end thereof which includes a notched portion. The notched portions of the bottom plate part are fitted with the boss portions of the end plate, and the notched portions of the engagement portions are fitted with the protruding portions of the front plate to form engagement hooks at most tip ends of the engagement portions, respectively, thereby connecting the stator and the front plate.

11 Claims, 11 Drawing Sheets

BACKGROUND ART

BACKGROUND ART

BACKGROUND ART

STEPPING MOTOR INCLUDING A CONNECTION STRUCTURE OF A STATOR YOKE AND A FRONT PLATE

BACKGROUND OF THE INVENTION

1. Field of the Invention

The present invention relates to a stepping motor, and particularly, to a connection structure of a stator yoke and a front plate.

2. Description of the Related Art

In a related-art stepping motor, as shown in FIG. 9, an attachment plate 104 which rotationally supports a rotor 103 is caulking-fixed to a motor frame 102 which holds a stator 101. Specifically, a caulking piece 106 is engaged to a caulking recess portion 105 formed by cutting at an open edge portion of the motor frame 102, and the caulking piece 106 is then caulked to fix the attachment plate 104.

However, this fixing operation of the attachment plate 104 by caulking is not easy. In addition, the caulking fixing of the attachment plate 104 causes deformation or distortion in the attachment plate 104, which in turn causes a core deviation between the rotor 103 and a bearing 107 mounted to the attachment plate 104. As a result, the rotor 103 cannot be smoothly rotated, thereby causing vibration and noise of the motor. Further, non-uniformity in properties of the motor may be caused.

In contrast to the fixing structure of the attachment plate by caulking, it is suggested that components are connected with a band without caulking-fixing (for example, see JP-A-UM-S49-46003 and JP-A-UM-S61-22473).

FIG. 10 shows a small gear fixture for a motor disclosed in JP-A-UM-S49-46003 in which a motor 206 and a gear mechanism 207 are connected by a connection frame 201. The connection frame 201 is formed by bending a metal plate into a U-shape and a tip end of a bent portion 202 is formed with an engagement edge 203 having a tip end which is slightly bent inwardly. The connection frame 201 is mounted from a side of the motor 206 and the gear mechanism 207 which are assembled each other, and the engagement edge 203 is engaged at a proper position of the gear mechanism 207, so that the motor 206 and the gear mechanism 207 are connected.

FIG. 11 shows a small synchronous motor of a band fixing type disclosed in JP-A-UM-S61-22473 in which stator cases 303, 303' and a flange 302 are connected by a band 311. The band 311 is made of an elastic plate and has tip ends that are inwardly bent to form hook-shaped bent portions 312. The hook-shaped bent portions 312 are pressed in recess holes 313 of the flange 302 to latch the band 311, thereby connecting the stator cases 303, 303' and the flange 302.

However, according to the connection frame 201 disclosed in JP-A-UM-S49-46003, the engagement edge 203 provided at the tip end of the bent portion 202 of the connection frame 201 is formed by simple bending, and therefore, it cannot be said that the engagement is surely sufficient. In addition, the motor 206 may be moved in a peripheral direction while the connection frame 201 being mounted. Thus, it cannot be said that the rotation is surely prevented.

According to the band 311 disclosed in JP-A-UM-S61-22473, the tip ends thereof are inwardly bent to form the hook-shaped bent portions 312, which are pressed in the recess holes 313 of the flange 302. Thus, the engagement feature is not problematic. However, since an extruded part formed at a back end of the band 311 is simply fitted in an inner hole of the stator case 303', there is a concern that the flange 302 may be rotated together with the band 311 depending on a degree of the fitting of the extruded part. That is, it cannot be said that the rotation is surely prevented. In addition, according to JP-A-UM-S61-22473, corner parts of both ends of the band 311 are protruded, so that a space for accommodating the corner parts is required. Thus, it is difficult to realize reducing the size.

SUMMARY OF THE INVENTION

The present invention has been made to solve the problem described above, and it is an aspect of the present invention to provide a stepping motor in which an assembling operation is simplified by using a band without caulking in order to fix a front plate to a stator, the front plate is prevented from being deformed to obtain stable motor characteristics having less non-uniformity, and the band is prevented from being rotated to increase a connection strength between the stator and the front plate.

According to an illustrative embodiment of the present invention, there is provided a stepping motor comprising: a stator; a front plate provided on an upper surface of the stator; and a band connecting the stator and the front plate. The stator has an end plate at bottom surface thereof, and boss portions are integrated with the end plate. Recess portions are formed adjacent to an outer peripheral edge of the front plate, and a protruding portion is provided in each of the recess portions. The band is made of an elastic member and has a U-shape including a bottom plate part and two attachment parts that are connected to the bottom plate part. The bottom plate part includes an opening at a center thereof and two notched portions at both sides of the opening. Each of the attachment parts includes an engagement portion at a tip end thereof, the engagement portion including a notched portion. The notched portions of the bottom plate part are fitted with the boss portions of the end plate, respectively, and the notched portions of the engagement portions are fitted with the protruding portions of the front plate to form engagement hooks at most tip ends of the engagement portions, respectively, thereby connecting the stator and the front plate.

According to another illustrative embodiment of the present invention, there is provided a stepping motor comprising: a stator; a front plate provided on an upper surface of the stator; and a band connecting the stator and the front plate. The stator has an end plate at a bottom surface thereof, and a boss portion is integrated with the end plate. A recess portion is formed adjacent to an outer peripheral edge of the front plate, and a protruding portion is provided in the recess portion. The band is made of an elastic member and includes a plate-shaped attachment part and two engagement portions that are formed by bending both ends of the attachment part, each of the engagement portions including a notched portion. The notched portion of one of the engagement portions is fitted with the boss portion of the end plate, the notched portion of the other of the engagement portion is fitted with the protruding portion of the front plate to form an engagement hook at the most tip end of the other of the engagement portions, thereby connecting the stator and the front plate.

According to the above configuration, it is possible to provide a stepping motor in which since the front plate is not fixed by caulking, an assembling operation is simplified, the front plate is prevented from being deformed to obtain stable motor characteristics having less non-uniformity, and the band is prevented from being rotated to increase a connection strength between the stator and the front plate.

DETAILED DESCRIPTION

<First Illustrative Embodiment>

Hereinafter, a first illustrative embodiment of the present invention will be described with reference to FIG. 1 to FIG. 5.

Figure 1:
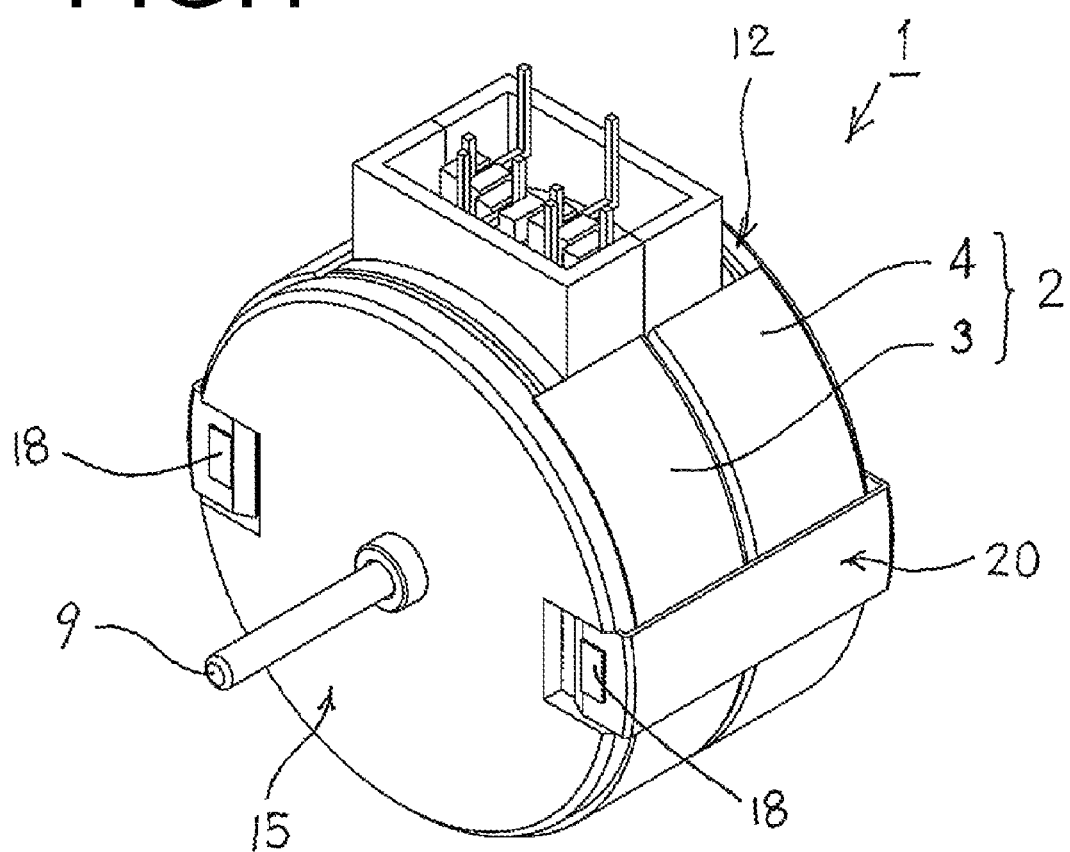
FIG. 1 is a perspective view of a stepping motor according to a first illustrative embodiment of the present invention.
Figure 2:
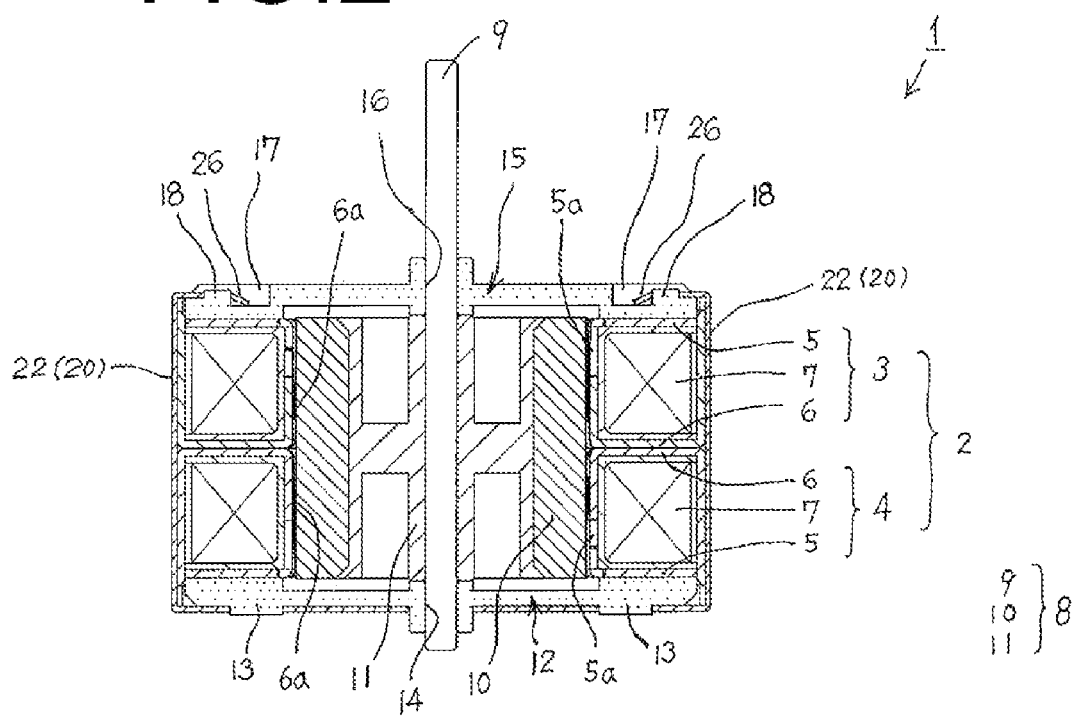
FIG. 2 is a sectional view of the stepping motor shown in FIG. 1.
Figure 3:
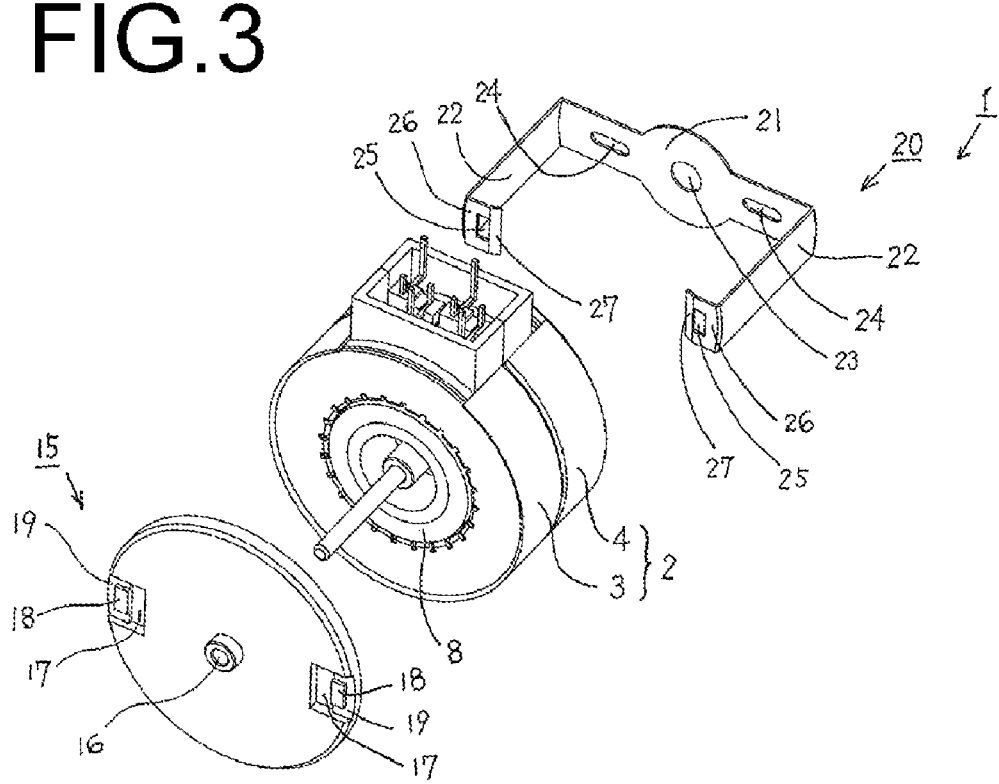
FIG. 3 is an exploded perspective view of the stepping motor shown in FIG. 1.
Figure 4:
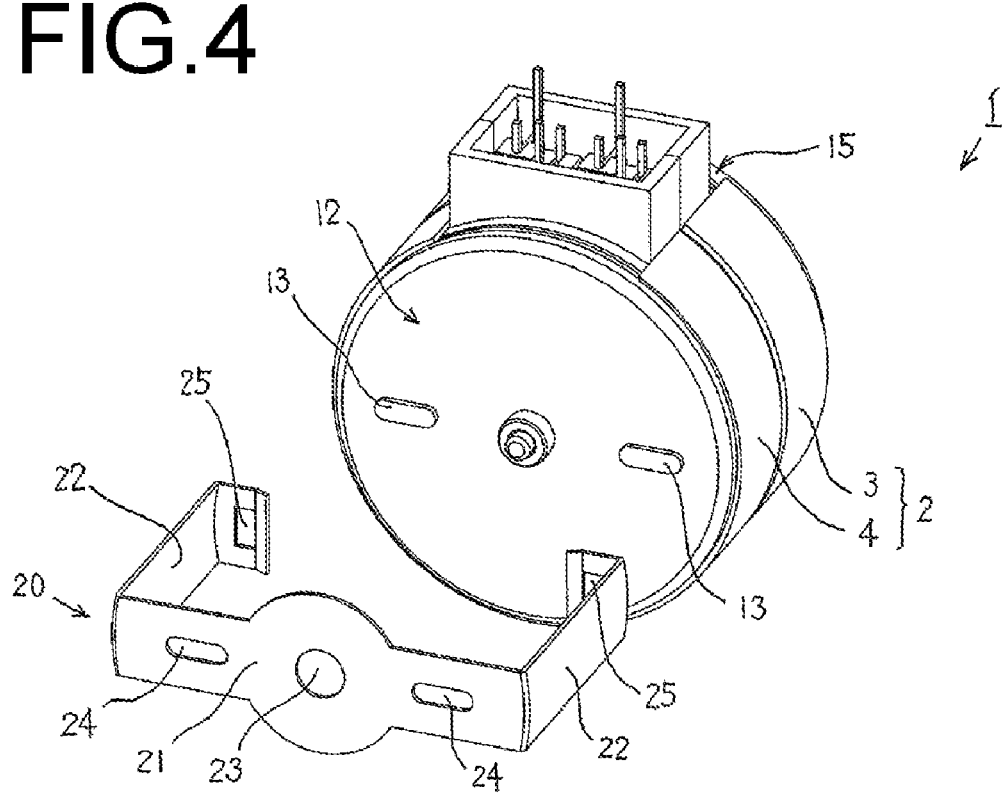
FIG. 4 shows a state in which a band is detached from a bottom surface of the stepping motor shown in FIG. 1.

FIG. 1 is a perspective view of a stepping motor according to the first illustrative embodiment of the present invention. The stepping motor includes a stator and a front plate connected by a band, FIG. 2 is a sectional view of the stepping motor shown in FIG. 1, FIG. 3 is an exploded perspective view of the stepping motor shown in FIG. 1, and FIG. 4 shows a bottom surface of the stepping motor shown in FIG. 1.

A stepping motor 1 according to a first illustrative embodiment includes a stator 2 and a rotor 8. The stator 2 has a stator unit 3 (A phase) and a stator unit 4 (B phase) and the stator unit 3 (A phase) and the stator unit 4 (B phase) are stacked in an axial direction to form a two-phase structure. The rotor 8 has a shaft 9, a rotor magnet 10 and a sleeve 11. The rotor magnet 10 is fixed to an outer circumference of the sleeve 11 made of a non-magnetic material, and the sleeve 11 is fixed to the shaft 9. The rotor 8 is rotatably provided in the stator 2.

The stator unit 3 (A phase) has a disc-shaped inner yoke 5 made of an electro-magnetic steel plate, a coil 7 wound on a bobbin and a cup-shaped outer yoke 6 made of an electro-magnetic steel plate, and the coil 7 is interposed between the inner yoke 5 and the outer yoke 6. In addition, similarly to the stator unit 3 (A phase), the stator unit 4 (B phase) also has a disc-shaped inner yoke 5 made of an electro-magnetic steel plate, a coil 7 wound on a bobbin and a cup-shaped outer yoke 6 made of an electro-magnetic steel plate, and the coil 7 is interposed between the inner yoke 5 and the outer yoke 6.

The inner yoke 5 has a plurality of pole teeth 5a and the outer yoke 6 also has a plurality of pole teeth 6a. The pole teeth 5a of the inner yoke 5 and the pole teeth 6a of the outer yoke 6 are alternately engaged and are opposed to the rotor magnet 10.

The stator unit 3 (A phase) and the stator unit 4 (B phase) are stacked in the axial direction at a predetermined position and a synthetic resin is then injected and molded in the stator 2, so that the synthetic resin is also filled between the pole teeth 5a and the pole teeth 6a. As a result, the stator unit 3 (A phase) and the stator unit 4 (B phase) are integrated.

At the same time of the resin-molding, an end plate 12 is integrated at a bottom surface of the stator unit 4 (B phase) and at least two boss portions 13 are integrated with the end plate 12 (two boss portions 13 are formed in the drawing). The end plate 12 is formed with a through-hole 14 at a center of the end plate 12, which functions as a bearing for supporting the rotor 8. The two boss portions 13 are formed at both sides of the through hole 14.

A front plate 15 serving as an attachment plate is formed of the same synthetic resin as the resin mold, and the front plate 15 is formed with a through-hole 16 at a center of the front plate 15, which functions as a bearing for supporting the rotor 8.

In addition, two recess portions 17 are formed adjacent to an outer peripheral edge of the front plate 15 and protruding portions 18 are formed in the recess portions 17, respectively. Further, step portions 19 are formed at the outer peripheral edges outside the protruding portions 18 of the recess portions 17, respectively, in a radial direction of the rotor 8. The recess portions 17 are formed to be deeper than step portions 19 in the axial direction.

A band 20 is made of an elastic member. For example, the band is formed by punching and bending a thin metal plate having a spring property (for example, stainless steel). The band 20 has a U-shape including a bottom plate part and attachment parts that are connected to both sides of the bottom plate part. In this illustrative embodiment, the band 20 is formed by punching and bending a thin plate of metal having a spring property (for example, stainless steel). Specifically, the band 20 has a U-shape including a bottom plate part 21 and two attachment parts 22, 22 that are continuously connected to the bottom plate part 21. The bottom plate part 21 includes an opening 23 at a center thereof and two notched portions 24 at both sides of the opening 23. The notched portions 24 are fitted with the boss portions 13 that are formed at the end plate 12. The two attachment parts 22, 22 have engagement portions 26 at tip ends thereof. The engagement portions 26 are formed with notched portions 25, respectively. The notched portions 25 are fitted with the protruding portions 18 formed at the front plate 15, respectively. Tip ends of the two engagement portions 26 are fitted in the recess portions 17 of the front plate 15, respectively.

Next, a mounting operation of the band 20 will be described.

First, a thin plate of stainless steel is punched to form the band 20 that is bent into a U-shape. Then, tip ends of the two attachment parts 22, 22 are slightly bent inwardly to form the engagement portions 26.

Then, the end plate 12 is inserted into the opening 23 of the bottom plate part 21 of the band 20 and the boss portions 13 formed at the end plate 12 are fitted in the notched portions 24, so that the attachment parts 22, 22 are positioned on an outer circumference of the stator 2. Then, the tip ends of the engagement portions 26 are pressed into the recess portions 17 of the front plate 15, so that the tip ends of the engagement portions 26 are fitted in the recess portions 17 of the front plate 15 and the protruding portions 18 formed in the recess portions 17 of the front plate 15 are respectively fitted in the notched portions 25 formed at the engagement portions 26. At this time, since the recess portions 17 are formed to be deeper than the step portions 19, the most tip ends of the engagement portions 26 are slightly bent inwardly in the axial direction when pressing and fitting the tip ends of the engagement portions 26, so that the most tip ends of the engagement portions 26 form engagement hooks 27, respectively.

That is, since the tip ends of the engagement portions 26 of the band 20 are fitted in the recess portions 17 of the front plate 15, it is possible to easily connect the front plate 15 and the stator 2 without caulking the front plate 15 and the stator 2. In addition, since the boss portions 13 of the end plate 12 are fitted with the notched portions 24 of the bottom plate part 21 of the band 20, and the protruding portions 18 formed in the recess portions 17 of the front plate 15 are fitted with the notched portions 25 of the engagement portions 26 of the band 20, they serve as a rotation preventing mechanism. As a result, it is possible to connect the front plate 15 and the stator 2 further firmly. Additionally, since the caulking is not used, it is possible to prevent the front plate 15 from being deformed and to simplify the assembling operation.

Figure 5:
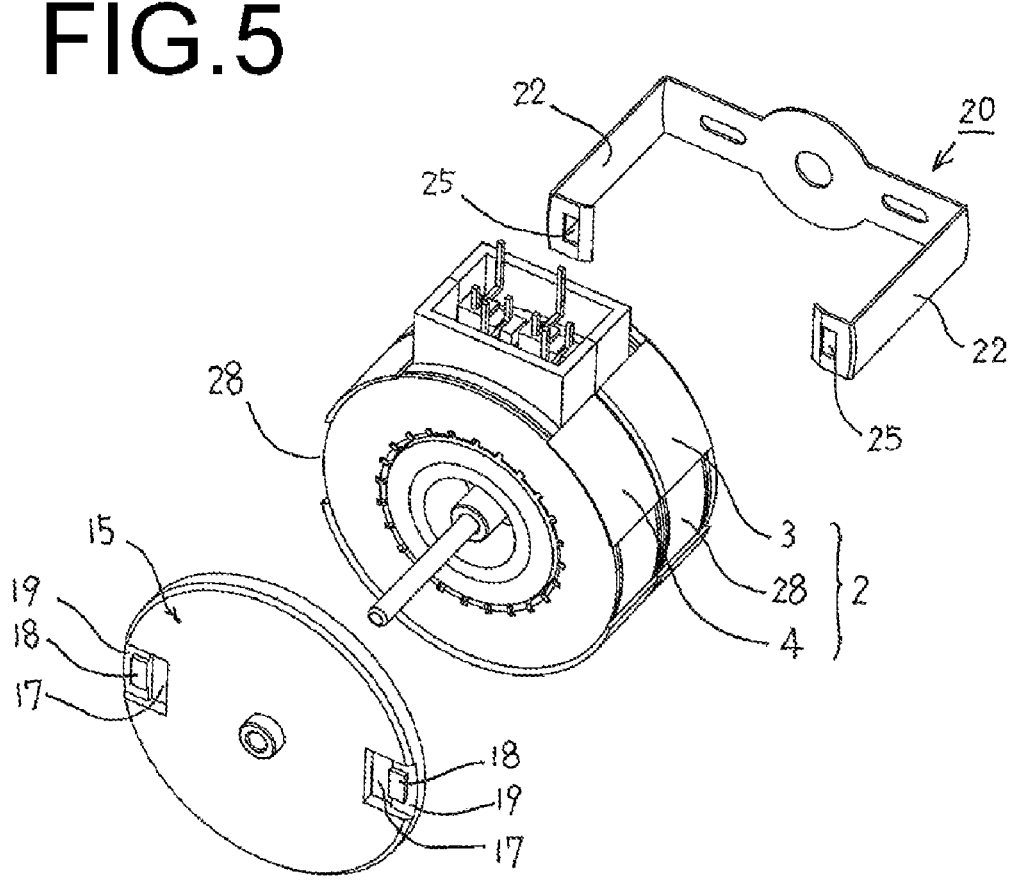
FIG. 5 is a perspective view showing a modified illustrative embodiment of the stepping motor shown in FIG. 1.

FIG. 5 is a perspective view showing a modified illustrative embodiment of the stepping motor shown in FIG. 1. This modified illustrative embodiment is different from the first illustrative embodiment shown in FIG. 1, in that two notched parts 28 are provided on the outer circumference of the stator 2. The attachment parts 22 of the band 20 are fitted in the notched parts 28. As a result, it is possible to mount the attachment parts 22 so that the attachment parts 22 do not protrude from the outer circumference of the stator 2. This is advantageous in a point of view of reducing the radial size. The notched parts 28 formed on the outer circumference of the stator 2 can be formed without influencing on a magnetic circuit.

In FIGS. 1 and 5, the band 20 has the two attachment parts 22. However, three attachment parts 22, which are equally arranged at a distance of 120°, or more attachment parts 22 may be also possible.

In the illustrative embodiments, the band 20 is formed by punching and bending the thin plate of metal having a spring property. However, the present invention is not limited thereto. For example, the band 20 may be formed by another processing method such as wire cutting. Further, the band 20 may be formed with a resin material having elasticity. In addition, the band 20 may have such a configuration that the most tip ends of the engagement portions 26 are slightly bent inwardly in the axial direction in advance to form the engagement hooks 27, thereby connecting the front plate 15 and the stator 2.

Further, the inner surfaces of the attachment parts 22 may have a curvature approximately same as that of the outer circumference of the stator 2. In this case, it is possible to closely arrange the attachment parts 22 on the outer circumference of the stator 2.

<Second Illustrative Embodiment>

Hereinafter, a second illustrative embodiment of the present invention will be described with reference to FIG. 6 and FIG. 7.

Figure 6:
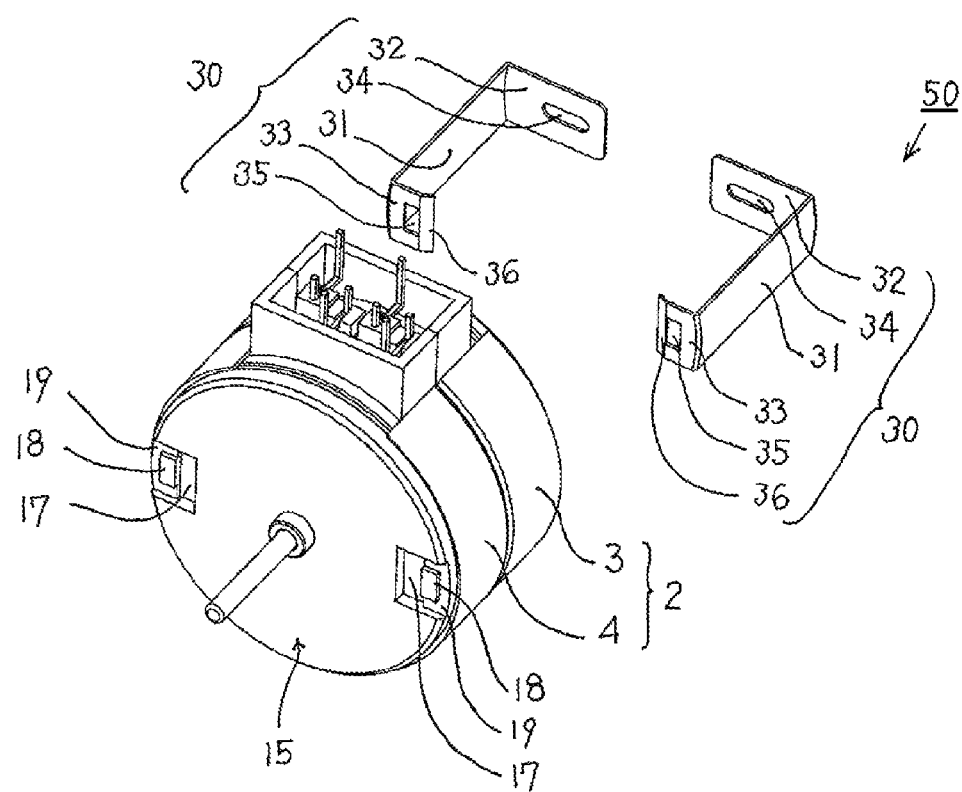
FIG. 6 is a perspective view showing a stepping motor according to a second illustrative embodiment of the present invention.
Figure 7:
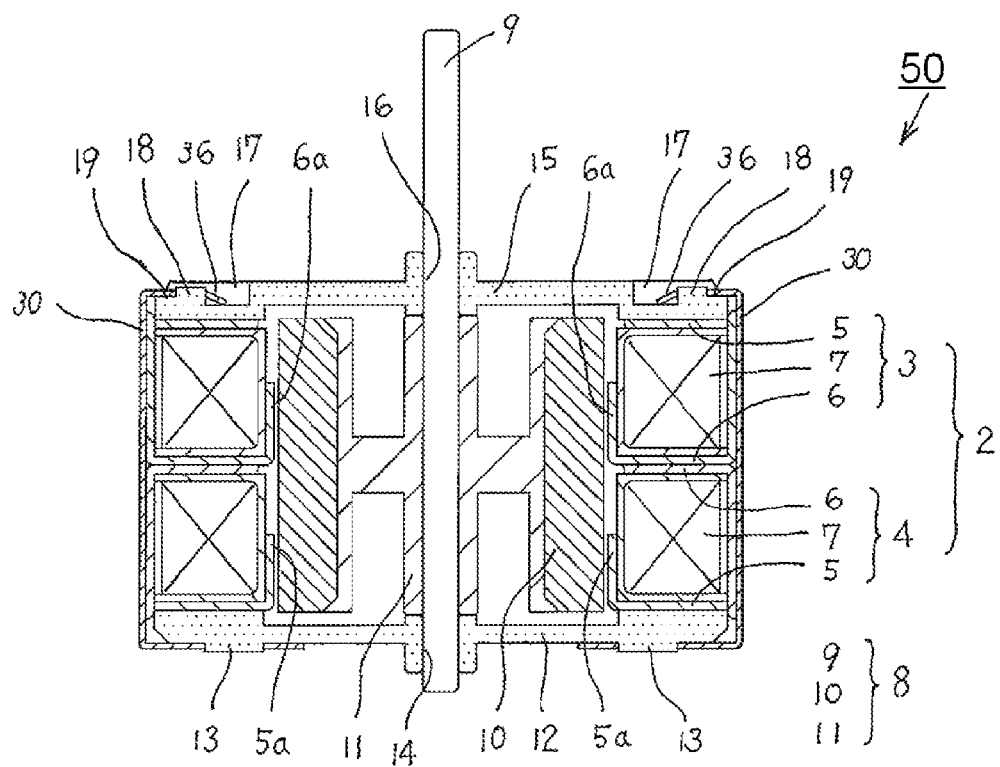
FIG. 7 is a sectional view of the stepping motor shown in FIG. 6.

FIG. 6 is a perspective view showing a stepping motor according to the second illustrative embodiment of the present invention, and FIG. 7 is a sectional view of the stepping motor shown in FIG. 6.

A stepping motor 50 according to the second illustrative embodiment includes the stator 2 and the rotor 8. The stator 2 has the stator unit 3 (A phase) and the stator unit 4 (B phase) and the stator unit 3 (A phase) and the stator unit 4 (B phase) are stacked in the axial direction to form a two-phase structure. The rotor 8 has the shaft 9, the rotor magnet 10 and the sleeve 11. The rotor magnet 10 is fixed to the outer circumference of the sleeve 11 made of the non-magnetic material and the sleeve 11 is fixed to the shaft 9. The rotor 8 is rotatably provided in the stator 2.

The stepping motor 50 has the same configuration as the first illustrative embodiment shown in FIG. 1 except for the band 20. Thus, the specific descriptions of the structure of the stepping motor 50 will be omitted.

Bands 30 are made of an elastic member. For example, the bands 30 are formed by punching and bending thin metal plates having a spring property (for example, stainless steel). Each band has a plate-shaped attachment part 31 and engagement portions 32, 33 that are formed by inwardly bending both ends of the attachment part in the radial direction. The engagement portions 32, 33 of each of the bands 30 are formed with notched portions 34, 35, respectively. The notched portion 34 is fitted with the boss portion 13 that is formed at the end plate 12. The notched portion 35 is fitted with the protruding portion 18 that is formed at the front plate 15. A tip end of the engagement portion 33 is fitted in the recess portion 17 of the front plate 15. At this time, since the recess portion 17 is formed to be deeper than the step portion 19, when the tip end of the engagement portion 33 is pressed and fitted, the most tip end of the engagement portion 33 is slightly bent inwardly in the axial direction, thereby forming an engagement hook 36.

That is, since the tip ends of the engagement portions 33 of the bands 30 are fitted in the recess portions 17 of the front plate 15, respectively, it is possible to easily connect the front plate 15 and the stator 2 without caulking the front plate 15 and the stator 2. In addition, since the boss portions 13 of the end plate 12 are respectively fitted with the notched portions 34 of the engagement portions 32 of the bands 30, and the protruding portions 18 formed in the recess portions 17 of the front plate 15 are respectively fitted with the notched portions 35 of the engagement portions 33 of the bands 30, they serve as a rotation preventing mechanism.

As a result, similarly to the first illustrative embodiment, it is possible to connect the front plate 15 and the stator 2 more firmly. Further, since the caulking is not used, it is possible to prevent the front plate 15 from being deformed and to simplify the assembling operation.

Figure 8:
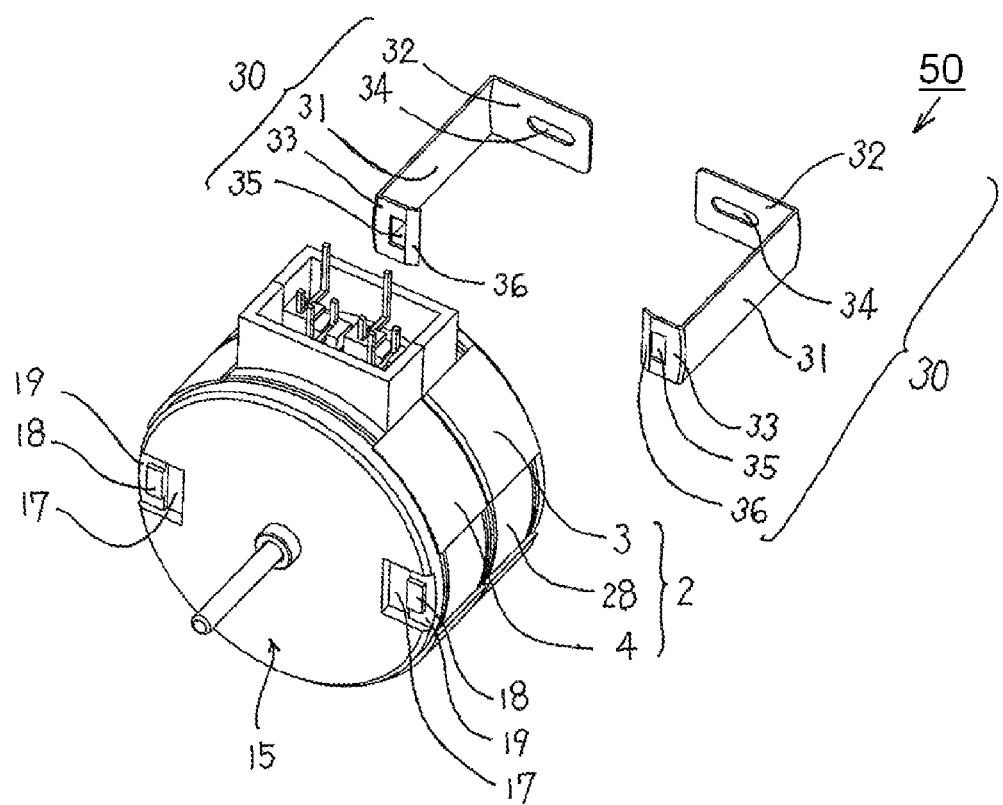
FIG. 8 is a perspective view showing a modified illustrative embodiment of the stepping motor shown in FIG. 6.
Figure 9:
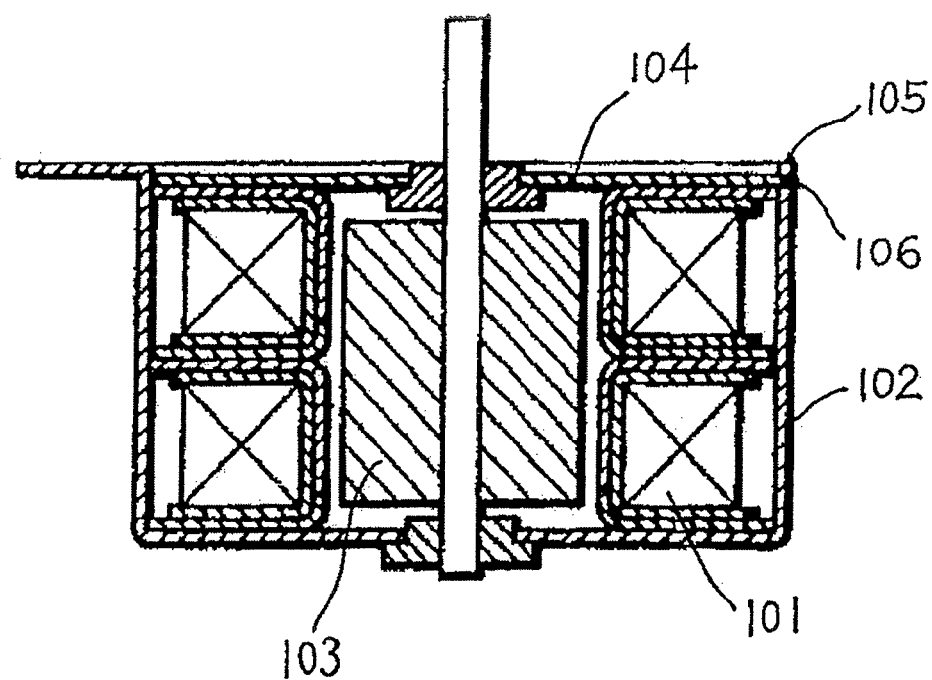
FIG. 9 illustrates a caulking fixing in a related-art stepping motor.
Figure 10:
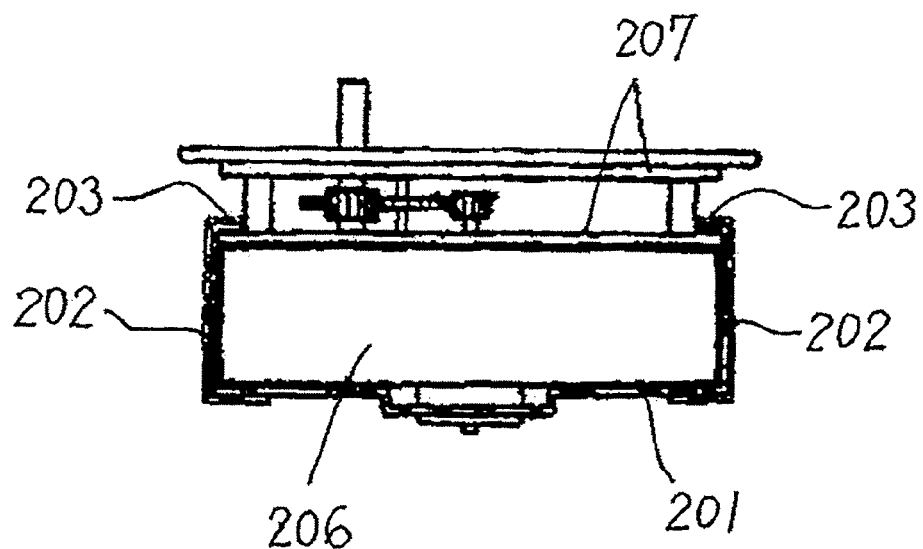
FIG. 10 shows another related-art stepping motor.
Figure 11:
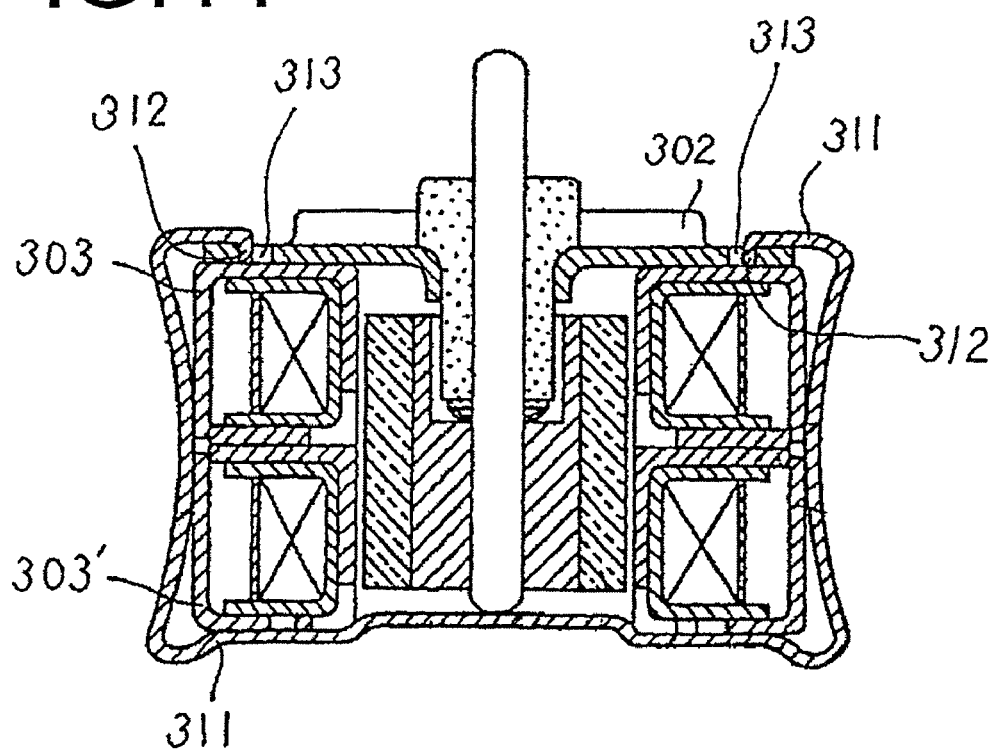
FIG. 11 shows a further related-art stepping motor.

FIG. 8 is a perspective view showing a modified illustrative embodiment of the stepping motor 50 shown in FIG. 6. This modified illustrative embodiment is different from the second illustrative embodiment shown in FIG. 6, in that two notched parts 28 are provided on the outer circumference of the stator 2. The attachment parts 31 of the bands 30 are accommodated in the notched parts 28. As a result, it is possible to mount the attachment parts 31 so that the attachment parts do not protrude from the outer circumference of the stator 2. This is advantageous in a point of view of reducing the radial size.

In FIGS. 6 and 8, the two bands 30 are mounted. However, the bands 30 may be three or more.

In the illustrative embodiments, the band 30 is formed by punching and bending the thin plate of metal having a spring property. However, the present invention is not limited thereto. For example, the band 30 may be formed by another processing method such as wire cutting. Further, the band 30 may be formed with a resin material having elasticity. In addition, the band 30 may have such a configuration that the most tip end of the engagement portion 33 is slightly bent inwardly in the axial direction in advance to form the engagement hook 36, thereby connecting the front plate 15 and the stator 2.

Further, the inner surfaces of the attachment parts 31 may have a curvature approximately same as that of the outer circumference of the stator 2. In this case, it is possible to closely arrange the attachment parts 31 on the outer circumference of the stator 2.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A stepping motor comprising:
   a stator;
   a front plate provided on an upper surface of the stator; and
   a band connecting the stator and the front plate,
   wherein the stator has an end plate at bottom surface thereof, and boss portions are integrated with the end plate,
   wherein recess portions are formed adjacent to an outer peripheral edge of the front plate, and a protruding portion is provided in each of the recess portions,
   wherein the band is made of an elastic member and has a U-shape including a bottom plate part and two attachment parts that are connected to the bottom plate part,
   wherein the bottom plate part includes an opening at a center thereof and two notched portions at both sides of the opening,
   wherein each of the attachment parts includes an engagement portion at a tip end thereof, the engagement portion including a notched portion, and
   wherein the notched portions of the bottom plate part are fitted with the boss portions of the end plate, respectively, and the notched portions of the engagement portions are fitted with the protruding portions of the front plate to form engagement hooks at most tip ends of the engagement portions, respectively, thereby connecting the stator and the front plate.

2. The stepping motor according to claim 1,
   wherein the front plate includes step portions outside the protruding portions of the recess portions in a radial direction, and
   wherein the recess portions are deeper than the step portions in an axial direction.

3. The stepping motor according to claim 2,
   wherein the engagement hooks are arranged at a position deeper than the step portions in the axial direction.

4. The stepping motor according to claim 1,
   wherein notched parts are formed on an outer circumference of the stator and the attachment parts of the band are accommodated in the notched parts.

5. The stepping motor according to claim 1,
   wherein an inner surface of each of the attachment parts has a curvature approximately same as that of an outer circumference of the stator.

6. A stepping motor comprising:
   a stator;
   a front plate provided on an upper surface of the stator; and
   a band connecting the stator and the front plate,
   wherein the stator has an end plate at a bottom surface thereof, and a boss portion is integrated with the end plate,
   wherein a recess portion is formed adjacent to an outer peripheral edge of the front plate, and a protruding portion is provided in the recess portion,
   wherein the band is made of an elastic member and includes a plate-shaped attachment part and two engagement portions that are formed by bending both ends of the attachment part, each of the engagement portions including a notched portion, and
   wherein the notched portion of one of the engagement portions is fitted with the boss portion of the end plate, the notched portion of the other of the engagement portion is fitted with the protruding portion of the front plate to form an engagement hook at the most tip end of the other of the engagement portions, thereby connecting the stator and the front plate.

7. The stepping motor according to claim 6,
   wherein the front plate includes a step portion outside the protruding portion of the recess portion in a radial direction, and
   wherein the recess portion is deeper than the step portion in an axial direction.

8. The stepping motor according to claim 7,
   wherein the engagement hook is arranged at a position deeper than the step portion in the axial direction.

9. The stepping motor according to claim 6,
   wherein a notched part is formed on an outer circumference of the stator and the attachment part of the band is accommodated in the notched part.

10. The stepping motor according to claim 6,
    wherein an inner surface of the attachment part has a curvature approximately same as that of an outer circumference of the stator.

11. The stepping motor according to claim 6,
    wherein two of the band is used for connecting the stator and the front plate.

* * * * *